United States Patent
Hogstead

(10) Patent No.: US 11,168,538 B2
(45) Date of Patent: Nov. 9, 2021

(54) PROCESS FOR PRODUCING FLUIDS FROM A HYDROCARBON-BEARING FORMATION

(71) Applicant: Cenovus Energy Inc., Calgary (CA)

(72) Inventor: Clifford Vernon Hogstead, Calgary (CA)

(73) Assignee: Cenovus Energy Inc., Calgary (CA)

(*) Notice: Subject to any disclaimer, the term of this patent is extended or adjusted under 35 U.S.C. 154(b) by 46 days.

(21) Appl. No.: 16/673,739

(22) Filed: Nov. 4, 2019

(65) Prior Publication Data

US 2020/0141209 A1    May 7, 2020

Related U.S. Application Data

(60) Provisional application No. 62/755,972, filed on Nov. 5, 2018.

(51) Int. Cl.
| | |
|---|---|
| *E21B 41/00* | (2006.01) |
| *E21B 33/138* | (2006.01) |
| *E21B 47/06* | (2012.01) |
| *E21B 43/24* | (2006.01) |
| *E21B 47/07* | (2012.01) |

(52) U.S. Cl.
CPC ............ *E21B 33/138* (2013.01); *E21B 41/00* (2013.01); *E21B 43/2408* (2013.01); *E21B 47/06* (2013.01); *E21B 47/07* (2020.05)

(58) Field of Classification Search
CPC .... E21B 33/138; E21B 43/2408; E21B 47/07; E21B 47/06; E21B 41/00
See application file for complete search history.

(56) References Cited

U.S. PATENT DOCUMENTS

| | | | |
|---|---|---|---|
| 4,224,989 | A | 9/1980 | Blount |
| 4,344,485 | A | 8/1982 | Butler |
| 4,566,478 | A | 1/1986 | Deaton |
| 6,253,854 | B1 | 7/2001 | Fenton |
| 6,769,486 | B2 | 8/2004 | Lim et al. |
| 2003/0015321 | A1* | 1/2003 | Lim ................. E21B 43/16 166/263 |
| 2006/0113077 | A1* | 6/2006 | Willberg ............. C09K 8/508 166/280.1 |

(Continued)

FOREIGN PATENT DOCUMENTS

| | | |
|---|---|---|
| CA | 1304287 C | 6/1992 |
| RU | 2092516 C1 | 10/1997 |
| RU | 2212527 C1 | 9/2003 |

*Primary Examiner* — Taras P Bemko
(74) *Attorney, Agent, or Firm* — Borden Ladner Gervais LLP; Geoffrey deKleine

(57) ABSTRACT

A process includes injecting mobilizing fluid, including a solvent, through an injection well and into a hydrocarbon-bearing formation. Fluids are produced from the hydrocarbon-bearing formation to a surface through a well, and injection of the mobilizing fluid is discontinued. Gas flow to the surface from the well is inhibited by injecting a loss circulation material that inhibits solvent-vapor flow from exiting the formation through the well such that a fluid column that includes the well kill fluid, the loss circulation material, or a combination thereof is maintained within the well. The well is opened to perform work thereon After degradation of the loss circulation material, injecting the mobilizing fluid and producing the produced fluids is commenced.

18 Claims, 2 Drawing Sheets

(56) References Cited

U.S. PATENT DOCUMENTS

| | | | | |
|---|---|---|---|---|
| 2012/0118565 | A1* | 5/2012 | Trautman | E21B 43/16 |
| | | | | 166/272.6 |
| 2012/0325467 | A1 | 12/2012 | Lebel et al. | |
| 2014/0051606 | A1* | 2/2014 | Dobson, Jr. | C09K 8/64 |
| | | | | 507/107 |
| 2015/0166873 | A1* | 6/2015 | Tomlinson | E21B 33/13 |
| | | | | 166/293 |
| 2015/0285051 | A1* | 10/2015 | Miller | E21B 43/2408 |
| | | | | 166/272.3 |
| 2016/0069171 | A1* | 3/2016 | Stancliffe | E21B 43/2401 |
| | | | | 166/254.1 |
| 2016/0298017 | A1* | 10/2016 | Takahashi | C09K 8/44 |
| 2016/0304398 | A1* | 10/2016 | Phan | C04B 24/121 |
| 2016/0333680 | A1* | 11/2016 | Richter | E21B 23/08 |
| 2018/0112126 | A1* | 4/2018 | Yang | C09K 8/58 |
| 2018/0346786 | A1* | 12/2018 | Zielinski | C08G 18/73 |

* cited by examiner

PROCESS FOR PRODUCING FLUIDS FROM A HYDROCARBON-BEARING FORMATION

TECHNICAL FIELD

The present disclosure relates to the production of fluids including hydrocarbons from a subterranean formation bearing heavy oil or bitumen.

BACKGROUND

Extensive deposits of viscous hydrocarbons exist around the world. Reservoirs of such deposits may be referred to as reservoirs of heavy hydrocarbon, heavy oil, extra-heavy oil, bitumen, or oil sands, and include large subterranean deposits in Alberta, Canada that are not susceptible to standard oil well production technologies. The hydrocarbons in such deposits are typically highly viscous and do not flow at commercially relevant rates at the temperatures and pressures present in the reservoir. For such reservoirs, various recovery techniques may be utilized to mobilize the hydrocarbons and produce the mobilized hydrocarbons from wells drilled in the reservoirs. For example, various thermal techniques may be used to heat the reservoir to mobilize the hydrocarbons and produce the heated, mobilized hydrocarbons from wells.

Hydrocarbon substances of high viscosity are generally categorized as "heavy oil" or as "bitumen". Although these terms are in common use, references to heavy oil and bitumen represent categories of convenience, and there is a continuum of properties between heavy oil and bitumen. Accordingly, references to such types of oil herein include the continuum of such substances, and do not imply the existence of some fixed and universally recognized boundary between the substances.

One thermal method of recovering viscous hydrocarbons from a subterranean hydrocarbon-bearing formation using spaced horizontal wells is known as steam-assisted gravity drainage (SAGD). Various embodiments of the SAGD process are described in Canadian Patent No. 1,304,287 and corresponding U.S. Pat. No. 4,344,485. In the SAGD process, steam is injected through an upper, horizontal, injection well into a viscous hydrocarbon reservoir while hydrocarbons are produced from a lower, substantially parallel, horizontal, production well that is vertically spaced from and near the injection well. The injection and production wells are generally located close to the base of the hydrocarbon deposit to collect the hydrocarbons that flow toward the production well.

Such thermal processes are energy intensive, utilize significant volumes of water for the production of steam, and require additional equipment to handle the steam or gasses produced.

A solvent may be utilized to aid a steam-assisted recovery process, for example in a so-called solvent-aided process (SAP) or a solvent driven process (SDP). To further reduce steam use, solvent may be injected without steam in a solvent-only (solvent-based) recovery process. Hydrocarbon solvent is generally utilized to reduce viscosity and improve mobility in the hydrocarbon reservoir, potentially improving production and/or reducing steam and/or heating requirements.

Challenges remain in providing solvent-recovery processes for efficient and effective commercial application.

SUMMARY

According to an aspect of an embodiment, there is provided a process for producing fluids from a subterranean hydrocarbon-bearing formation. The process includes injecting mobilizing fluid including a solvent into the hydrocarbon-bearing formation through an injection well and into the hydrocarbon-bearing formation, producing produced fluids from the hydrocarbon-bearing formation to a surface through a production well, discontinuing injecting the mobilizing fluid and injecting a loss circulation material and a fluid into one of the injection well and the production well, opening the one of the injection well and the production well to perform work on the one of the injection well and the production well, and closing the one of the injection well and the production well. After degradation of the loss circulation material, injecting the mobilizing fluid and producing the produced fluids is commenced.

According to another aspect of an embodiment, there is provided a process for workover of a well utilized in producing fluids from a subterranean hydrocarbon formation that includes a solvent injected therein. The process includes injecting a loss circulation material and a fluid into the well to inhibit solvent vapor exiting through the well, opening well to perform work on the well, closing the well, and after degradation of the loss circulation material, recommencing utilizing the well in producing fluids.

BRIEF DESCRIPTION OF THE DRAWINGS

Embodiments of the present invention will be described, by way of example, with reference to the drawings and to the following description, in which.

DETAILED DESCRIPTION

Figure 1:
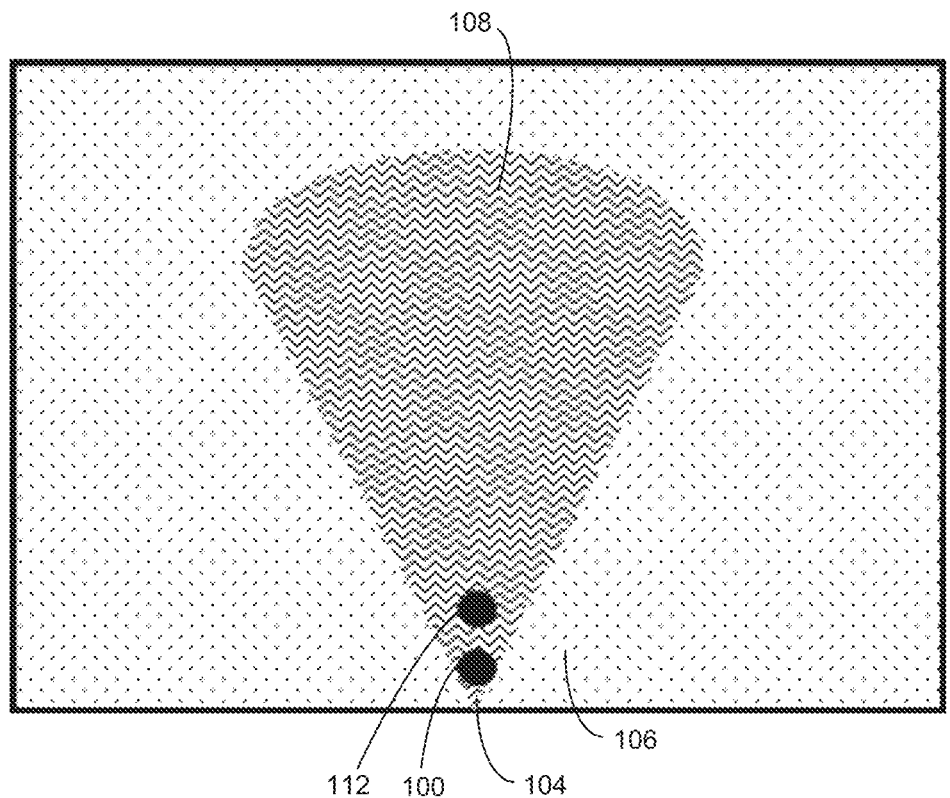
FIG. 1 is a schematic sectional view of a reservoir and shows the relative location of an injection well and a production well.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to a system and process for workover of a well utilized in producing fluids from a subterranean hydrocarbon formation. The hydrocarbon recovery process employed on that well may include the injection of a mobilizing fluid. The mobilizing fluid includes a solvent. The process includes injecting a loss circulation material and a fluid into the well to maintain a fluid column in the wellbore, that provides sufficient hydrostatic pressure to at least balance the formation pressure. The fluid column inhibits gasses and vapour exiting through the well. This facilitates opening the well to perform work on the well, closing the well, and after degradation of the loss circulation material, recommencing utilizing the well in producing fluids.

Figure 2:
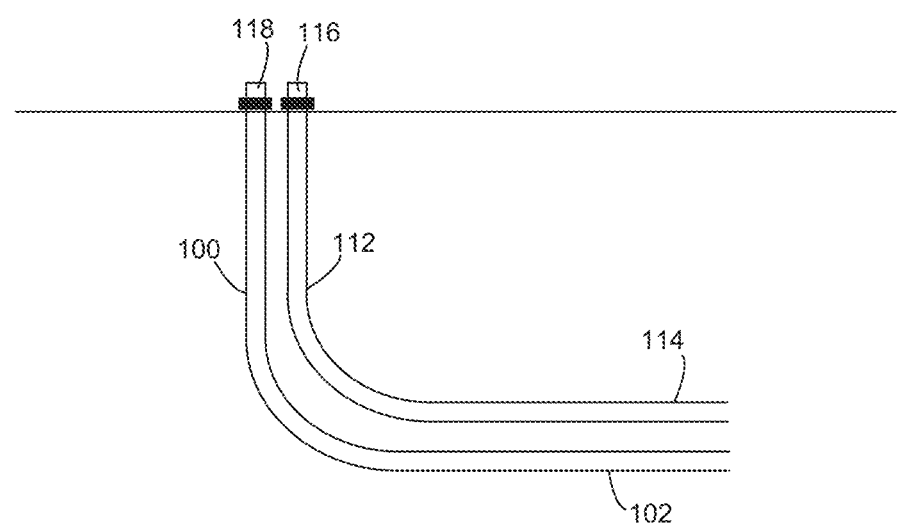
FIG. 2 is a sectional side view of a well pair including an injection well and a production well.

As described above, a solvent process such as a solvent-aided process may be utilized for mobilizing viscous hydrocarbons. In the SAP process, a well pair, including a mobilizing fluid injection well and a hydrocarbon production well are utilized. One example of a well pair is illustrated in FIG. 1 and FIG. 2. The hydrocarbon production well 100 includes a generally horizontal segment 102 that extends near the base or bottom 104 of the hydrocarbon reservoir 106. A mobilizing fluid injection well 112 also includes a generally horizontal segment 114 that is disposed generally parallel to and is spaced vertically above the horizontal segment 102 of the hydrocarbon production well 100.

During SAP, mobilizing fluid is injected into an injection well head 116 and through the mobilizing fluid injection well 112 to mobilize the hydrocarbons and create a mobilizing fluid chamber 108 in the reservoir 106, around and above the generally horizontal segment 114. The mobilizing fluid includes steam and hydrocarbons, which may include solvent injected with the steam. The volume of hydrocarbons injected may be 10% to 20% by volume of the mobilizing fluid, with the remainder being steam.

The solvent may be a single solvent or a mixture of solvents. The solvent vaporizes with little additional energy input.

Viscous hydrocarbons in the reservoir are heated and mobilized and the mobilized hydrocarbons drain under the effects of gravity. Fluids, including the mobilized hydrocarbons along with aqueous condensate and solvent, are collected in the generally horizontal segment 102 and are recovered via the hydrocarbon production well 100 and the production well head 118. The fluids may also include solvent in vapour phase.

The relative volume of light hydrocarbons in the mobilizing fluid may also be higher than the relative volume utilized in a SAP process. For example, a solvent only process may be utilized in which the mobilizing fluid is close to 100% solvent.

After startup or after a period of production of fluids including hydrocarbons, a workover may be performed to change, add, or remove equipment, such as piping, tubing, pumps, or other equipment in the mobilizing fluid injection well 112 or in the production well 100. In instances in which a well workover is performed, for example, the injection well head 116 or the production well head 118 is opened for such a workover, vaporized solvent previously injected into the hydrocarbon-bearing formation may enter the well, exiting at the wellhead and posing a danger while work is performed on the well. With an increase in the use of solvents in hydrocarbon recovery processes, it is desirable to inhibit fluids or vapours from entering the wellbore where the solvents or vapours may escape to atmosphere and cause risk to workers.

Figure 3:
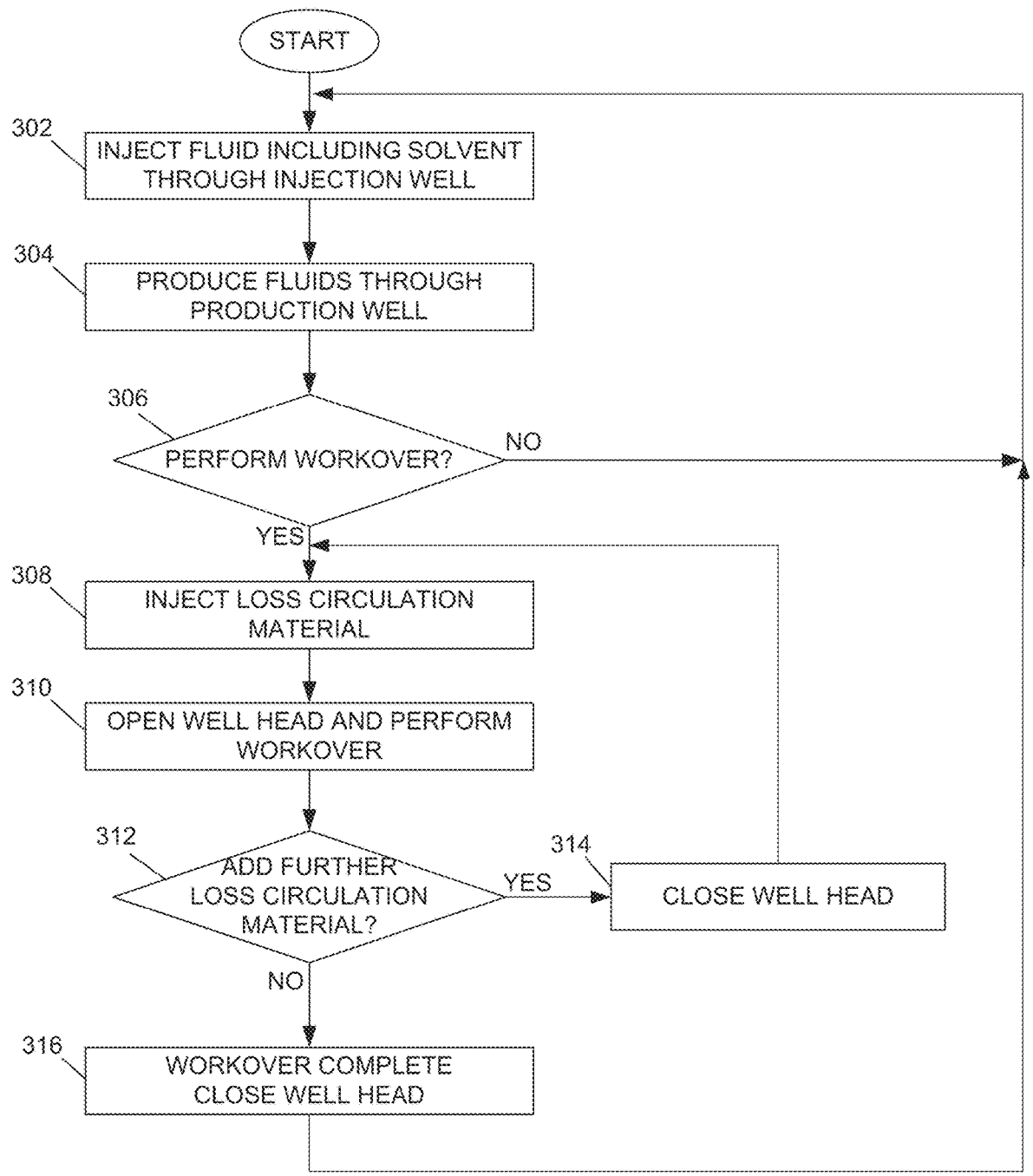
FIG. 3 is a flowchart showing a process for producing fluids from a subterranean hydrocarbon-bearing reservoir according to an embodiment.

Reference is made to FIG. 3 to describe a process for producing fluids from a subterranean hydrocarbon-bearing reservoir according to an embodiment. The process for producing fluids includes a process for performing a workover. The process for producing fluids may contain additional or fewer subprocesses than shown or described, and parts of the process may be performed in a different order.

As referred to above, mobilizing fluid is injected into the injection well head 116 and through the mobilizing fluid injection well 112 at 302 to mobilize the hydrocarbons and create a mobilizing fluid chamber 108 in the reservoir 106, around and above the generally horizontal segment 114. The mobilizing fluid includes steam and a solvent.

In selecting suitable solvents for use in a recovery process, the properties and characteristics of various candidate solvents may be considered and compared. For a given selected solvent, the corresponding operating parameters during co-injection of the solvent with steam should also be selected or determined in view the properties and characteristics of the selected solvent. For example, the phase diagrams of the solvents may be helpful for such selection. At a given pressure, the boiling points of different solvents are different, and at a given temperature the saturation vapor pressures of different solvents are different. Solvents employed in the production of fluids from a subterranean hydrocarbon reservoir may include lighter hydrocarbon solvents such as for example methane, ethane, propane or butane. Additionally or alternatively, heavier hydrocarbon solvents such as, for example, pentane, hexane, heptane, octane may also be employed. Additionally or alternatively solvents may include combinations of solvents, for example a diluent solvent which may for example include at least 80% by volume C1-C30 alkanes, and/or less than 25% by volume C1-C4 alkanes, and/or at least 60% by volume C5-C12 alkanes, and/or less than 25% C13-C30 alkanes.

The mobilizing fluid may include any volume percent of solvent with the remainder being steam.

Viscous hydrocarbons in the reservoir are heated and mobilized and the mobilized hydrocarbons drain under the effects of gravity. Fluids, including the mobilized hydrocarbons along with aqueous condensate and solvent, are collected in the generally horizontal segment 102 and are produced via the hydrocarbon production well 100 and the production well head 118 at 304. The solvent that is produced along with the hydrocarbons is optionally separated from the remainder of the produced fluid at the well pad or at a central surface solvent separation facility and the solvent may be reused.

When no workover is performed, the process continues at 302.

In response to a decision to perform a workover at 306, the process continues at 308. The decision to perform a workover at 306 may be made to change, add, or remove equipment in either the mobilizing fluid injection well 112 or in the production well 100.

To provide well control during a workover, loss circulation material is injected and well kill fluid is added into the well at 308. The loss circulation material is injected to inhibit the loss of well killing fluids through the liner to the formation, during the workover. Wells are referred to as killed when the well bore is filled with a fluid column that remains generally static. The density of the fluid and the height of the fluid column are utilized to provide a bottom hole pressure that balances the formation pressure. Well kill fluid may be water produced though the well operations. The water is cleaned of oil, sand, and fines at the production facility and delivered to the wells, for example, utilizing tanker trucks, or stored on site in tanks. The well kill fluid may be hot due to the processes, and may be referred to as "hot produced" or "produced water". Fresh water may also be utilized. Alternatively, brine water may be utilized as the well kill fluid. With a density of about 1200 kg/m$^3$ as opposed to the density of produced water at about 1000 kg/m$^3$, brine water may be utilized as well kill fluid in instances in which the formation pressure is higher than that which is held with produced water.

The loss circulation material allows a hydrostatic head of kill fluid to be maintained in the well bore inhibiting solvent vapour or other well fluids from flowing to surface. The loss circulation material allows some kill fluid to leak out of the wellbore to the formation, which in turn is replaced by cooler water pumped into the wellbore, at continuous low rates of, for example, 50 to 80 liters/minute, in a process referred to as trickle rates. This inhibits water that is heated in the wellbore from flashing off as steam. The loss circulation material is a material that thermally degrades with time to provide a temporary, although leaky, block. The rate at which the loss circulation material degrades is dependent on the temperature in the well. The loss circulation material may be a polymeric material that expands in the well into which it is injected to provide the temporary block. One example of such a loss circulation material is PolyBLOK™ C, available from SECURE Energy Services. Another example of such a loss circulation material is EnerCure™ available from Canadian Energy Services.

PolyBLOK™ C is comprised of granular solid beads that swell up to 100% in water. PolyBLOK™ C degrades at high temperatures of, for example 140° C. or greater and over time. This loss circulation material may be utilized with freshwater with hydration of the loss circulation material beginning during mixing with water and prior to pumping downhole. The temperature of the freshwater and the mix affect the hydration as warmer temperatures result in faster hydration. PolyBLOK™ is suitable for use in production tubing in which the PolyBLOK™ is contained.

EnerCure™ is an absorbent polymer that degrades at high temperatures of, for example 160° C. or greater and over time. Swelling of EnerCure™ occurs in fresh water up to 50 times the original size or 100-200 times their weight. Swelling does not occur within one hour in brine solutions or in solvents alone. This loss circulation material may be pumped down a casing or annulus of the wellbore.

The loss circulation material may be injected within a period of time that is less than the time for the polymeric material to swell within the well. For example, the loss circulation material may be injected for a period of time of less than 60 minutes for a loss circulation material that swells or gels within about 60 minutes of preparation of the loss circulation material. In such a case, the loss circulation material may be injected for a period of time of less than 45 minutes. For example, the loss circulation material may be injected for a period of time of 30 minutes or less to facilitate injection prior to swelling of the loss circulation material.

The volume of loss circulation material injected may be dependent on factors including, the material utilized, the well pressure, well temperature, time until swelling or gelling of the loss circulation material, well geometry, or any other suitable factor.

After injection of the loss circulation material at 308, the well head is opened for the purpose of performing the workover. In response to detecting release of solvent vapor from the well during the workover, or in response to detecting fluid loss from the well. Fluid may be added to the wellbore to make up for leakage from the well. In response to determining that the rate of fluid addition to make up for leakage is at or above a threshold limit, further loss circulation material may be injected.

Further loss circulation material may be injected to maintain or improve the blocking of solvent vapor exiting through the well during the workover. In response to a decision to add further loss circulation material at 312, the process continues at 314 and the workover may be stopped and the well head closed.

Further loss circulation material may then be injected as the process continues at 308. The workover may be stopped and the well head closed at 314 at regular intervals for the injection of further loss circulation material at regular intervals as the workover is carried out. For example, the loss circulation material may degrade over a period of about 8 hours. In this case, the workover may be stopped and the wellhead closed about every 8 hours. The loss circulation material may then be injected about every 8 hours to continue inhibiting solvent vapor from exiting through the well during a workover that takes more than 8 hours. Thus, further loss circulation material may be injected after a period of time. The interval, or period time after which further loss circulation material is injected, is determined based on temperature, or pressure, or both temperature and pressure in the one of the mobilizing fluid injection well 112 and the production well 100 on which the workover is performed.

After completion of the workover or a portion of the workover for which the well head is opened, the well head is closed at 316 and the mobilizing fluid injection well 112 and production well 100 are utilized again in producing hydrocarbons.

The process may be utilized in applications in which a pressure in the hydrocarbon-bearing formation, and thus in the well, is, for example, about 2500 kPa to about 3200 kPa, and the temperature is, for example, about 180° C. to 250° C. In a particular example, the process was successfully utilized in a well having a pressure of about 2800 kPa and temperature of about 200° C. with multiple injections of PolyBLOK™ C as the loss circulation material.

As indicated above, EnerCure™ may be utilized as the loss circulation material. Sodium Chloride (NaCl) may be utilized to retard the hydration of EnerCure™ until the EnerCure™ comes into contact with fresh water. In preparing the EnerCure™ for injection, Sodium Chloride may be added to a premix tank, for example, at 1200 kg Sodium Chloride per $m^3$ of water. 50 kg of EnerCure™ per $m^3$ of brine may also be mixed. 5 $m^3$ of 1200 kg/$m^3$ NaCl may be pumped downhole, followed by 15 $m^3$ of 50 kg/$m^3$ EnerCure™ mix, and followed again by 5 $m^3$ of 1200 kg/$m^3$ NaCl. Fluid is continually pumped until the EnerCure™ reaches a desired depth. After a period of about 10 minutes, top filling utilizing produced water or fresh water is carried out in response to determining that gasses and vapors are successfully inhibited from exiting the formation. Freshwater may be utilized to ensure that the EnerCure™ hydrates quickly. The process may be repeated in response to determining that gasses and vapors are still exiting the formation but at a reduced rate.

The present process may also be applicable to wells in applications in which relatively high gas production rates are realized. For example, such a process may be applicable in a blowdown well in which gas, such as methane, is injected without heating while production of fluids and recovery of hydrocarbons continues or, thus allowing the temperature in the reservoir to decrease. The methane may be injected to generally maintain pressure in the reservoir during production. Optionally, production may be discontinued and methane may still be injected to maintain pressure, for example, for a neighboring well.

Advantageously, the process of the present application facilitates workover of a mobilizing fluid injection well or a production well after injection of a solvent. The process as illustrated and described herein may be utilized in any hydrocarbon recovery operation in which solvent is injected either alone, or with steam.

EXAMPLES

Example 1

The above-described process was utilized employing PolyBLOK™ C as the loss circulation material to inhibit solvent vapor from exiting a well during a change of a pump utilized in producing fluids. In this example, the well was an additional well drilled between two well pairs, for pumping hydrocarbons to surface. The Wedge Well™ liner hanger was located in the gas cap and leaks at the liner hanger allowed gas entry as the structurally lower liner allowed a loss of fluid head.

The formation pressure was about 2850 kPA. The hydrostatic head pressure difference between the liner top and the hanger was estimated to be about 450 kPA.

About 20 m$^3$ of water was mixed with the loss circulation material at 40 kg/m\3 and 18.5 m$^3$ of the mix was pumped down the production tubing followed by 3.5 m$^3$ fresh water displacement fluid. An additional 18 m$^3$ of produced water was pumped into the casing at 10 minute, 2.0 m$^3$ increments of produced water where small amounts of gas are bled off between increments in a process referred to as a top kill.

Maintaining static pressure on the casing while pumping the loss circulation material down the production tubing, through the pump, facilitated placement of the loss circulation material without the loss circulation material flowing up into the casing. The subsequent pumping of produced water into the casing and then maintaining a trickle volume consistent with leakage through the top liner facilitated completion of the pump change.

Solvent vapor was successfully inhibited from exiting the well during the workover. The casing pressure returned to 2500 kPa after 4 days.

Example 2

The process was also carried out on an injection well with a horizontal leg which sloped away and down from the heel area allowing the kill fluid to be lost to the formation. This continuous loss of hydrostatic head allowed gas at 2600 kPA formation pressure to enter the well bore and flow through a leak at surface. Initial attempts to inhibit vapor from exiting through the well were unsuccessful as trace H$_2$S gas was detected and, with the unknown casing condition, operations including holding gas pressure on the casing were not suitable. PolyBLOK™ was not suitable due to the casing leak and the procedures for its' use. The initial well kill was attempted with produced water was unsuccessful.

EnerCure™ was blended with saturated Sodium Chloride brine, and pumped down the well casing, where the brine acted to inhibit gas flow during placement. To place the EnerCure™ the brine mixing with other wellbore fluid reduced salinity facilitating hydration of the EnerCure™, which reduced fluid losses, in turn inhibiting gasses from exiting the formation through the well. Fresh water was utilized to trickle into the well to maintain a fluid level in the casing sufficient to inhibit flow.

Gasses and vapors from the formation were successfully inhibited from exiting the formation via the well and the bottom hole temperature of 190° C., was reduced sufficiently to inhibit flow to surface. Additional use of brine and loss circulation material, however blocked the wellbore during re-activation after completion of the workover. It was determined that high salinity inhibits the EnerCure™ from hydrating, resulting in a mass of material in the wellbore, which settled in the heel area. Adequate distribution of the EnerCure™ material and exposure to fresh water is desirable to begin hydration of this loss circulation material.

For this loss circulation material, the product may be mixed with brine and then pumped down the well casing. An additional volume of about 20% by volume freshwater may be pumped as the EnerCure™ and Brine are pumped down the well to begin hydration. Alternatively, the EnerCure™ and Brine may be exposed to freshwater downhole to facilitate swelling of the loss circulation material in place.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

The invention claimed is:

1. A process for producing fluids from a subterranean hydrocarbon-bearing formation, the process comprising:
   injecting mobilizing fluid, including a solvent through an injection well and into the hydrocarbon-bearing formation;
   producing produced fluids from the hydrocarbon-bearing formation to a surface through a production well;
   discontinuing injecting the mobilizing fluid;
   inhibiting gas flow to the surface from one of the injection well or the production well by injecting therein a loss circulation material that inhibits solvent-vapor flow from exiting the formation through the well such that a fluid column comprising a well kill fluid, the loss circulation material, or a combination thereof is maintained within the one of the injection well or the production well;
   opening the one of the injection well or the production well to perform work thereon;
   injecting further loss circulation material after opening the one of the injection well and the production well, in response to release of a solvent vapor from the one of the injection well or the production well;
   closing the one of the injection well or the production well;
   after degradation of the loss circulation material, commencing injecting the mobilizing fluid and producing the produced fluids.

2. The process according to claim 1, wherein the solvent is a diluent.

3. The process according to claim 1, wherein the solvent comprises one of methane, ethane, propane, butane, pentane, hexane, heptane, octane, or any combination thereof.

4. The process according to claim 1, comprising injecting further loss circulation material after a period of time.

5. The process according to claim 4, wherein the period of time is determined based on one or both of a temperature in the one of the injection well and the production well or a pressure in the one of the injection well or the production well.

6. The process according to claim 1, wherein a volume of the loss circulation material that is injected is determined based on a temperature in the one of the injection well and the production well.

7. The process according to claim 1, wherein the loss circulation material comprises a polymeric material that expands in the one of the injection well or the production well.

8. The process according to claim 1, wherein the loss circulation material comprises a material that degrades at a rate dependent on temperature.

9. The process according to claim 1, wherein a pressure in the one of the injection well or the production well is in a range of about 2500 kPa to about 3200 kPa.

10. The process according to claim 1, wherein a temperature in the one of the injection well or the production well is in a range of about 180° C. to about 250° C.

11. A process for workover of a well utilized in producing fluids from a subterranean hydrocarbon-bearing formation, to a surface, the process comprising:
- inhibiting gas flow to the surface by injecting a loss circulation material that inhibits solvent-vapor flow from exiting the hydrocarbon-bearing formation through the well such that a fluid column comprising a well kill fluid, the loss circulation material, or a combination thereof is maintained within the well;
- opening the well to perform work on the well;
- injecting further loss circulation material after opening the well, in response to release of a solvent vapor from the well;
- closing the well;
- after degradation of the loss circulation material, recommencing utilizing the well in producing fluids.

12. The process according to claim 11, wherein the solvent is a diluent.

13. The process according to claim 11, wherein the solvent comprises one of methane, ethane, propane, butane, pentane, hexane, heptane, octane, and any combination thereof.

14. The process according to claim 11, wherein a volume of the loss circulation material that is injected is determined based on a temperature in the well.

15. The process according to claim 11, wherein the loss circulation material comprises a polymeric material that expands in the well.

16. The process according to claim 11, wherein the loss circulation material comprises a material that degrades at a rate dependent on temperature.

17. The process according to claim 11, wherein a pressure in the well is in a range of about 2500 kPa to about 3200 kPa.

18. The process according to claim 11, wherein a temperature in the well is in a range of about 180° C. to about 250° C.

* * * * *